(12) United States Patent
Boss et al.

(10) Patent No.: US 8,775,523 B2
(45) Date of Patent: Jul. 8, 2014

(54) METHOD AND SYSTEM TO INTELLIGENTLY ROUTE MESSAGE REQUESTS

(75) Inventors: Gregory Jensen Boss, American Fork, UT (US); Rick Allen Hamilton, II, Charlottesville, VA (US); Kevin C. McConnell, Austin, TX (US); Douglas Mark Wegman, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1384 days.

(21) Appl. No.: 11/616,696

(22) Filed: Dec. 27, 2006

(65) Prior Publication Data
US 2008/0162640 A1 Jul. 3, 2008

(51) Int. Cl.
*G06F 15/16* (2006.01)
(52) U.S. Cl.
USPC .......................................................... 709/206
(58) Field of Classification Search
USPC .......................................................... 709/206
See application file for complete search history.

(56) References Cited

U.S. PATENT DOCUMENTS

| | | | |
|---|---|---|---|
| 6,346,952 B1 | 2/2002 | Shtivelman | |
| 2002/0059164 A1* | 5/2002 | Shtivelman | 707/1 |
| 2004/0049543 A1 | 3/2004 | Kaminsky et al. | |
| 2004/0249001 A1 | 12/2004 | Leboeuf | |
| 2004/0249901 A1* | 12/2004 | Wallace et al. | 709/207 |
| 2005/0086290 A1 | 4/2005 | Joyce et al. | |
| 2005/0213743 A1* | 9/2005 | Huet et al. | 379/265.09 |
| 2005/0262209 A1* | 11/2005 | Yu | 709/206 |
| 2006/0080130 A1* | 4/2006 | Choksi | 705/1 |
| 2006/0174340 A1* | 8/2006 | Santos et al. | 726/21 |
| 2007/0219978 A1* | 9/2007 | Myers | 707/5 |

* cited by examiner

*Primary Examiner* — Joon H Hwang
*Assistant Examiner* — Suraj Joshi
(74) *Attorney, Agent, or Firm* — Yee & Associates, P.C.; Arthur Samodovitz

(57) ABSTRACT

A computer-implemented method of routing an electronic message. The electronic message is received. A rank, within an organization, of a sender of the electronic message is determined. The electronic message is routed to a destination computer based upon the rank of the sender.

35 Claims, 5 Drawing Sheets

METHOD AND SYSTEM TO INTELLIGENTLY ROUTE MESSAGE REQUESTS

BACKGROUND

1. Technical Field

The present invention relates generally to an improved data processing system and in particular to a method and apparatus for routing electronic messages. More particularly, the present invention relates to a method, implemented in a data processing system, a data processing system, and a computer usable program product for routing emails and instant electronic messages based on one or more parameters.

2. Description of the Related Art

In the modern world, electronic messages in the form of emails or instant messages are used to communicate information, requests, and questions. The easy availability of electronic messages has dramatically increased the number of electronic messages being sent back and forth over computer messages. While electronic messages are convenient, large numbers of electronic messages can result in waste or inefficiency.

For example, high ranking individuals of an organization, such as executives and members of upper-management in a corporation, are often inundated with electronic messages containing questions and requests regarding many different types of issues. Issues can range from requests for assistance, questions regarding who to consult about addressing a particular issue, questions regarding procedures, requests for procurement, and many other issues.

However, the large number of electronic messages can needlessly consume the high-ranking individual's time and resources, especially when most questions and issues can be addressed by others in the organization. As a result, some electronic messages are answered after an unacceptable delay or are not answered at all. The high-ranking individual can become frustrated by the excessive work, particularly when most of the excessive work can be processed by others. Lower-ranking individuals in the organization can become frustrated due to delays in processing requests or due to unanswered requests.

Solutions have been proposed for solving the problem of high-ranking individuals receiving too many electronic messages. For example, all or a portion of electronic messages can be forwarded to one or more particular individuals. However, this solution can complicate the problem because some electronic messages should only be answered by the high-ranking individual, but other individuals might answer the electronic message unintentionally or without knowledge that their provision of an answer is improper. Additionally, not all recipients might be qualified to answer certain messages, creating a delay in answering some electronic messages.

In another solution, a topic group can be created in which an individual can ask a question of all users registered in a topic group. However, this solution also has problems because the user might not know the correct topic group in which to send the electronic message. The electronic message can also become buried or lost among a vast number of other electronic messages contained in a particular topic group. Additionally, again, the appropriate individual to answer the electronic message might not be present in the topic group. Additionally, the answer to the question might not be correct as anyone in the topic group, potentially someone with incorrect information, could answer the electronic message inappropriately.

BRIEF SUMMARY

Illustrative embodiments provide for a method, implemented in a data processing system, of routing an electronic message. In one embodiment, such a method includes receiving an electronic message and determining a rank, within an organization, of a sender of the electronic message. The electronic message is routed to a destination data processing system based upon the rank of the sender.

Another embodiment provides for determining a subject matter of the electronic message and routing the electronic message to the destination data processing system further based upon the subject matter.

Another embodiment provides that the destination data processing system is associated with a subject matter expert.

Another embodiment provides for finding a key word in the electronic message and routing the electronic message to the destination data processing system further based upon the keyword.

Another embodiment provides for determining a subject matter of the electronic message, finding a key word in the electronic message, and routing the electronic message to the destination data processing system further based upon the subject matter and the keyword.

Another embodiment provides for routing the electronic message to the destination data processing system further based upon whether the electronic message is a reply to a second electronic message.

Another embodiment provides that the electronic message is the reply electronic message and that the method further includes routing the electronic message further based upon an elapsed time after the electronic message was sent.

Another embodiment provides for routing the electronic message as an instant electronic message when the rank has at least one of a predetermined value and a user selectable value.

Another embodiment provides for routing the electronic message to a third data processing system.

Another embodiment provides for causing the electronic message to be displayed only on a display associated with the destination data processing system.

Another embodiment provides that the electronic message is an instant electronic message in an instant messaging session and that the method further includes routing the electronic message to a second data processing system, receiving a second electronic message from the second data processing system, and, responsive to receiving the second electronic message, changing a state of the instant messaging session.

Another embodiment provides that changing the state of the instant messaging session includes at least one of closing the instant messaging session, causing all further electronic messages to be routed to the second data processing system, causing all further electronic messages to be routed to the destination data processing system, causing at least one further electronic message to be routed to a third data processing system, routing a copy of an instant messaging session to the second data processing system, routing the copy of the instant messaging session to the third data processing system, or changing how further electronic messages are routed.

Another embodiment provides for maintaining a list of senders and routing the electronic message to the destination data processing system further based upon whether the sender is in the list of senders.

Another embodiment provides that the list of senders is an exclusive list.

Another embodiment provides that the list of senders is an inclusive list.

Another embodiment provides for maintaining a user-defined rule set and routing the electronic message to the destination data processing system further based upon the rule set.

Another embodiment provides for a method, implemented in a data processing system, of routing an electronic message. The method includes receiving the electronic message at a first data processing system, the first data processing system having access to a list of passwords comprising a first password. Responsive to a second password contained in the electronic message matching the first password, the electronic message is routed to a second data processing system.

Another embodiment provides for determining a subject matter of the electronic message and routing the electronic message to the destination data processing system further based upon the subject matter.

Another embodiment provides for finding a key word in the electronic message and routing the electronic message to the destination data processing system further based upon the keyword.

Another embodiment provides that the electronic message is an instant electronic message in an instant messaging session and that the method further includes routing the electronic message to a third data processing system, receiving a second electronic message from the third data processing system, and, responsive to receiving the second electronic message, changing a state of the instant messaging session.

Another embodiment provides that the electronic message is an instant electronic message in an instant messaging session and that the method further includes routing the electronic message to a third data processing system, receiving a second electronic message from the third data processing system, and, responsive to receiving the second electronic message, changing a state of the instant messaging session.

Another embodiment provides that changing the state of the instant messaging session includes at least one of closing the instant messaging session, causing all further electronic messages to be routed to the third data processing system, causing all further electronic messages to be routed to the second data processing system, causing at least one further electronic message to be routed to a fourth data processing system, routing a copy of an instant messaging session to the third data processing system, routing the copy of the instant messaging session to the fourth data processing system, or changing how further electronic messages are routed.

Another embodiment provides for a computer program product. The computer program product includes a computer usable medium having computer usable program code which when executed on a data processing system causes the data processing system to route an electronic message. The computer program product also includes computer usable program code for receiving the electronic message at a first data processing system, computer usable program code for determining a rank, within an organization, of a sender of the electronic message, and computer usable program code for routing the electronic message to a second data processing system based upon the rank of the sender.

Another embodiment provides for computer usable program code for determining a subject matter of the electronic message and computer usable program code for routing the electronic message to the second data processing system further based upon the subject matter.

Another embodiment provides for computer usable program code for finding a key word in the electronic message and computer usable program code for routing the electronic message to the second data processing system further based upon the keyword.

Another embodiment provides for computer usable program code for determining a subject matter of the electronic message, computer usable program code for finding a key word in the electronic message, and computer usable program code for routing the electronic message to the second data processing system further based upon the subject matter and the keyword.

Another embodiment provides that the electronic message is an instant electronic message in an instant messaging session and wherein the computer program product further includes computer usable program code for routing the electronic message to a third data processing system, computer usable program code for receiving a second electronic message from the third data processing system, and computer usable program code for, responsive to receiving the second electronic message, changing a state of the instant messaging session.

Another embodiment provides that changing the state of the instant messaging session includes at least one of closing the instant messaging session, causing all further electronic messages to be routed to the third data processing system, causing all further electronic messages to be routed to the second data processing system, causing at least one further electronic message to be routed to a fourth data processing system, routing a copy of an instant messaging session to the third data processing system, routing the copy of the instant messaging session to the fourth data processing system, or changing how further electronic messages are routed.

Another embodiment provides for a data processing system including a processor, a bus connected to the processor, a communications unit connected to the bus, and a computer usable medium connected to the bus. The computer usable medium contains a set of instructions for routing an electronic message. The processor can carry out the set of instructions to receive the electronic message, determine a rank, within an organization, of a sender of the electronic message, and route the electronic message to a destination data processing system based upon the rank of the sender.

Another embodiment provides that the processor further can carry out the set of instructions to determine a subject matter of the electronic message and route the electronic message to the destination data processing system further based upon the subject matter.

Another embodiment provides that the processor further can carry out the set of instructions to find a key word in the electronic message and route the electronic message to the destination data processing system further based upon the keyword.

Another embodiment provides that the processor further can carry out the set of instructions to determine a subject matter of the electronic message, find a key word in the electronic message, and route the electronic message to the destination data processing system further based upon the subject matter and the keyword.

Another embodiment provides that the electronic message is an instant electronic message in an instant messaging session and that the processor further can carry out the set of instructions to route the electronic message to a second data processing system, receive a second electronic message at the communications unit from the second data processing system, and, responsive to receiving the second electronic message, change a state of the instant messaging session.

Another embodiment provides that changing the state of the instant messaging session includes at least one of closing the instant messaging session, causing all further electronic messages to be routed to the second data processing system, causing all further electronic messages to be routed to the destination data processing system, causing at least one further electronic message to be routed to a third data processing system, routing a copy of an instant messaging session to the second data processing system, routing the copy of the instant messaging session to the third data processing system, or changing how further electronic messages are routed.

Another embodiment provides that the processor further can carry out the set of instructions to route the electronic message as an instant electronic message when the rank has a predetermined value.

BRIEF DESCRIPTION OF THE DRAWINGS

The novel features believed characteristic of the illustrative embodiments are set forth in the appended claims. The illustrative embodiments, themselves, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN
ILLUSTRATIVE EMBODIMENT

Figure 1:
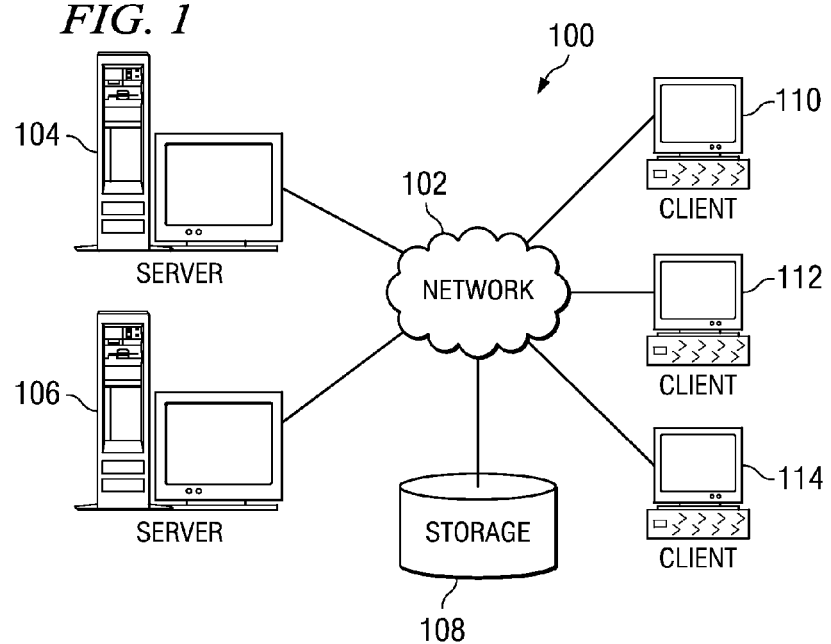
FIG. 1 is a pictorial representation of a network of data processing systems in which illustrative embodiments of the present invention may be implemented.
Figure 2:
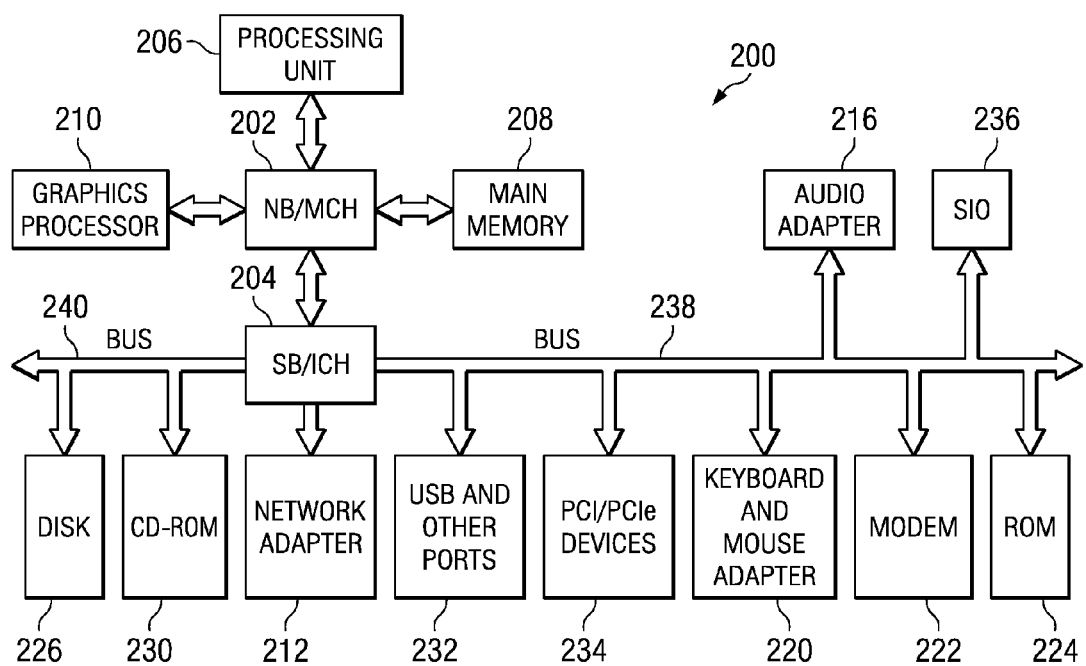
FIG. 2 is a block diagram of a data processing system in which illustrative embodiments of the present invention may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

An illustrative embodiment provides for a computer-implemented method of routing an electronic message. An electronic message can be any electronic message such as, for example, an email, an instant electronic message, or any other message containing text, image, a datagram, a data packet, or other data. The electronic message is received at a first computer. In this illustrative embodiment, the first computer can be any one of the data processing systems, such as servers and clients, shown in FIG. 1 and FIG. 2.

A rank, within an organization, of a sender of the electronic message is determined. A rank is a quantitative value, determined by an organization or a computer, that reflects the importance or value of a sender within an organization. The sender of the electronic message could be a person, an application, or another computer. Often, the sender is a computer associated with a particular user having the rank; however, the sender can be considered the user if the sender is using another computer and the sender is electronically associated with the electronic message, such as by using a password in conjunction with the associated messaging system.

The electronic message is routed to a second computer based upon the rank of the sender. The second computer can be any one of the data processing systems shown in FIG. 1 and FIG. 2. The second computer can be associated with a high ranking individual within an organization. Thus, in one illustrative embodiment, only messages important enough for consideration by the user of the second computer will reach that user.

Figure 3:
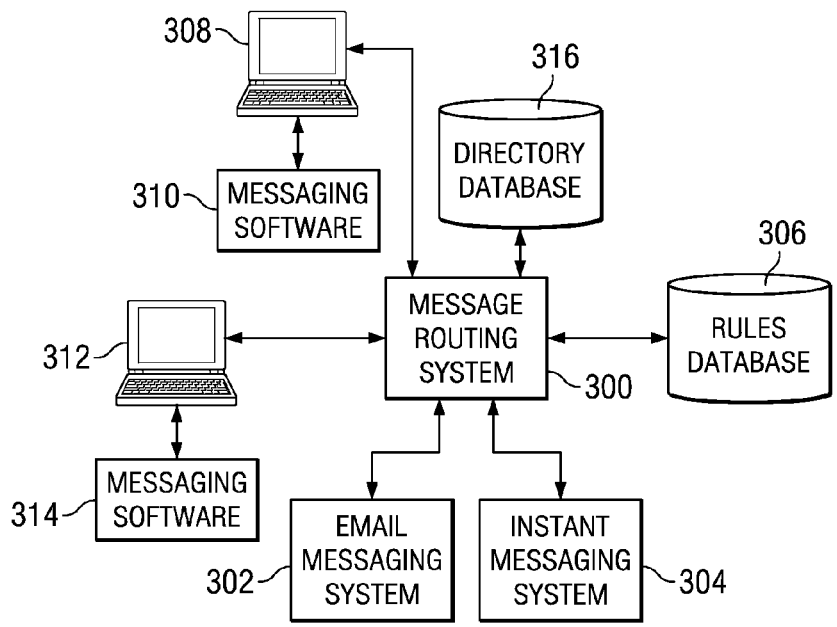
FIG. 3 is a block diagram of an electronic message routing system, in accordance with an illustrative embodiment of the present invention.

FIG. 3 is a block diagram of an electronic message routing system, in accordance with an illustrative embodiment of the present invention. Message routing system 300 can be implemented on one or more computers or data processing systems, such as servers 104 and 106 or clients 110, 112, or 114 in FIG. 1, or on data processing system 200 shown in FIG. 2. Electronic messages are routed over a network, such as network 102 in FIG. 1. Message routing system 300 can be implemented as hardware or software on one or more computers connected via a network.

In one illustrative embodiment, message routing system 300 is software implemented on a computer. Message routing system 300 is programmed to route electronic messages based upon various rules and other parameters, as described further below. In particular, message routing system 300 is programmed to route electronic messages based upon a rank of a sender of an electronic message.

Message routing system 300 can be implemented using any kind of system for routing electronic messages. Thus, for example, message routing system 300 can include email messaging system 302 and instant messaging system 304. Email messaging system 302 is software or hardware suitable for routing email messages to a destination computer or second computer. Instant messaging system 304 is software or hardware suitable for routing instant electronic messages to a destination computer or second computer.

Message routing system 300 uses information stored in memory, including random access memory or databases. In the illustrative example of FIG. 3, message routing system 300 uses rules database 306 and directory database 316 as bases for routing electronic messages. Although rules database 306 and directory database 316 are shown as different databases, both databases could be formed as a single database. Additionally, the information contained in either database could be stored in any format suitable for use by message routing system 300. Thus, the data in rules database 306 and directory database 316 could be stored in a form that is not in a database.

Rules database contains a number of rules that message routing system 300 uses to determine where an electronic message should be routed. Rules can be based on many different parameters such as, for example, a rank of a sender in an organization, a rank of a receiver in an organization, a subject matter of the electronic message to be sent, a keyword contained in the electronic message to be sent, whether a password has been contained in the electronic message to be sent, whether the electronic message is a reply to a previous electronic message sent by a high-ranking sender, whether the electronic message is a reply to a previous electronic message sent within a certain time period, user-defined rules for routing electronic messages. A sender is "high ranking" based on a determination made by a human. An example of a high ranking sender is an executive of a corporation. However, the term "high ranking" is relative to other individuals within an organization or sub-organization.

Rules database 306 can also route messages based upon combinations of the above rule. Thus, for example, an electronic message having a particular combination of keyword and subject matter could be routed to a computer associated with a first individual. However, an electronic message having a particular combination of keyword and rank could be sent to a computer associated with a second individual. Other combinations are possible, including combinations of two or more of keyword, rank, subject matter, identity of sender, identity of recipient, existence of a matching password, whether the message is a reply-to message and/or within a particular time window, user-defined rules, and other rules.

Each rule can result in an electronic message being sent to one or more other computers. A rule can specify that an electronic message intended for a high-ranking member of an organization instead be routed to a designated subject matter expert or some other assistant to the high-ranking member. A rule can specify that an electronic message having a particular subject be routed to one or more designated subject matter experts regardless of the designated intended recipient. A rule can specify that an electronic message having a particular subject be automatically replied-to with an electronic message asking the sender to contact one or more subject matter experts. Another rule can specify that such an automatic reply message contain a check-box for indicating whether the subject matter expert has been contacted. If the check box is marked to indicate that the subject matter expert has already been contacted, then a subsequent message to a computer associated with a high ranking individual is sent.

Other rules are possible. For example, a rule could specify that an electronic message from a particular individual is to be sent to a computer associated with a high-ranking member of the organization. A rule can specify that an electronic message intended for some other person instead be redirected to the high-ranking member in the organization. A rule can specify that an electronic message intended for a high-ranking member of an organization be routed to computers associated with both the high-ranking member and one or more other individuals in an organization. A rule can specify that only certain computers associated with certain individuals receive an electronic message. A rule can specify that computers associated with individuals below a certain rank cannot see or send messages to individuals above a certain rank. A rule can specify that computers associated with individuals above a certain rank can see or are allowed to send messages to individuals above a second rank. A rule can specify that electronic messages designated with a particular subject matter, such as private, only be routed or seen by particular other individuals. A rule can specify that computers associated with particular individuals can send electronic messages to particular other individuals. Another rule can specify that an electronic message marked with a priority level, such as urgent, low priority, or emergency, be routed to one or more other particular individuals. Another rule can specify that if an electronic message is a reply-to message from a computer associated with an individual of rank 1, and/or if the message is replied-to within a designated number of hours, then the message is routed to the individual of rank 1. Another rule can specify that any electronic message sent from a computer associated with a rank 1 individual be routed to a destination specified by the sender, regardless of any other rule. Another rule can specify that an electronic message without a subject or an electronic message having a general subject or an electronic message containing a general hail be replied-to with an automatic response. Many other rules are possible.

Messaging software 310 can combine multiple rules based upon additional rules sets. Thus, the end result of where an electronic message is routed can be entirely different than if rules were applied individually. For example, in one illustrative embodiment, a first rule might specify that an electronic message from a computer associated with an individual having a rank "medium" should be sent to assistant A. A second rule might specify that an electronic message with a designated subject matter "topic related" should be sent to subject matter expert S. A third rule can specify that an electronic message from a computer associated with an individual having a rank "medium" and also having a designated subject matter "topic related" should be sent to executive E.

In another example, especially for an instant messaging environment, all electronic messages from computers associated with individuals having a rank of 3 involving subject matter topics A through D are put in shadow answer mode. In shadow answer mode, the individuals sending the initial electronic message believe that they are in an instant messaging session with recipient R; however, instead, the electronic messages from the rank 3 senders are instead routed to individual I, who has authority to answer questions on behalf of intended recipient R. Thus, although individual I answers questions in the instant messaging session, the individuals of rank 3 believe that they are receiving answers from intended recipient R. This shadow answer mode system can also be used in the context of email.

Information regarding individuals to whom messages are routed is stored in directory database 316. A rank of an individual within an organization can be quantified as a number or a level associated with that individual. Directory database 316 can also store other information such as, for example, names, electronic addresses, physical addresses, geographical location, availability, expertise level, subject matter of expertise, position within the organization, position outside the organization, organizational affiliation, or any other information of interest. Thus, for example, message routing system 300 can identify a keyword contained in an electronic message, compare the keyword to directory database 316 to find a particular subject matter expert associated with the keyword, and subsequently route the message to the computer associated with the subject matter expert.

Together, message routing system 300 can use rules database 306 and directory database 316 to route an electronic message from a sender computer having messaging software 310 to a receiving computer 312 having messaging software 314. The sender computer can also be referred-to as a first computer, origin computer, or other term. The receiving computer can also be referred-to as a second computer, destination computer, or as another term.

Messaging software 310 and messaging software 314 can be any type of suitable messaging software. Examples of messaging software include email programs, instant messaging programs, and web browsers when used for web-based mail.

Messaging software 310 and messaging software 314 can be designed to interact specifically with message routing system 300. For example, messaging software 310 and messaging software 314 can include specific subject matter classifications intended for use by message routing system 300. An example of a specific subject matter classification is given in FIG. 4 and FIG. 5. Message routing system 300 can use a designated subject matter classification as input when determining how an electronic message should be routed based upon rules database 306.

Message routing system 300 can also include rules for changing a state of an instant messaging session based on the subject matter of an electronic message, the rank of an individual sending or receiving an electronic message, or other rules such as the rules designated above. The state of an instant messaging session can reflect different aspects of the session such as, for example, who is participating in the instant messaging session, which individuals can perceive other individuals in the instant messaging session, whether the instant messaging session is open or closed, what graphical user interface is presented to a particular user, or to whom instant electronic messages are sent based on rank, keyword, subject matter, user-defined rules, or other rules. Other states of an instant messaging session can be specified and changed.

A number of examples of the capabilities of message routing system 300 are set forth below. In one example, message routing system 300 can receive an electronic message at a first computer, determining a rank, within an organization, of a sender of the electronic message, and routing the electronic message to a second computer based upon the rank of the sender. Message routing system 300 subsequently determines a subject matter of the electronic message and routes the electronic message to the second computer further based upon the subject matter. The second computer can be associated with a subject matter expert.

In addition to routing the electronic message based upon the rank of the sender, message routing system 300 can find a keyword in the electronic message and route the electronic message to the second computer based upon the keyword. In addition to routing the electronic message based upon the rank of the sender, message routing system 300 can determine a subject matter of the electronic message, find a key word in the electronic message, and route the electronic message to the second computer further based upon the subject matter and the keyword.

In addition to routing the electronic message based upon the rank of the sender, message routing system 300 can route the electronic message to the second computer based upon whether the electronic message is a reply to a second electronic message. Message routing system 300 can route the electronic message further based upon an elapsed time since the second electronic message was sent.

In addition to routing the electronic message based upon the rank of the sender, message routing system 300 can route the electronic message as an instant electronic message when the rank has a predetermined value. In addition to routing the electronic message based upon the rank of the sender, message routing system 300 can route the electronic message to a third computer. Message routing system 300 can then cause the electronic message to be displayed only on a display associated with the second computer. In addition to routing the electronic message based upon the rank of the sender, message routing system 300 can maintain a user-defined rule set and route the electronic message to the second computer further based upon the rule set.

The rule set can be any set of rules created by a human or by a computer or other data processing system. A rule set can be based upon a rank of an individual within an organization, based upon a keyword, or based upon an identified subject matter of an electronic message. The rule set can be used to route an electronic message based a rank of an original recipient and/or based on a backup rank of the recipient. For example, a rule set can specify that when a recipient is offline, electronic messages are to be routed to a different destination as if the recipient had a different rank or position. Another rule could disable or enable this feature or other features for individuals of within a range of identified ranks.

When the electronic message is an instant electronic message in an instant messaging session, then in addition to routing the electronic message based upon the rank of the sender, message routing system 300 can route the electronic message to a third computer, receive a second electronic message from the third computer, and, responsive to receiving the second electronic message, change a state of the instant messaging session. The state of the instant messaging session can be one of closing the instant messaging session, causing all further electronic messages to be routed to the third computer, causing all further electronic messages to be routed to the second computer, causing at least one further electronic message to be routed to a fourth computer, routing a copy of an instant messaging session to the third computer, routing the copy of the instant messaging session to the fourth computer, or changing how further electronic messages are routed.

In addition to routing the electronic message based upon the rank of the sender, message routing system 300 can maintain a list of senders and route the electronic message to the second computer based upon whether the sender is in the list of senders. The list of senders can be an exclusive list or an inclusive list. An inclusive list is a list of senders which are the only senders allowed to send messages to a particular individual. An exclusive list is a list of senders which are not allowed to send messages to a particular individual.

In another example, message routing system 300 can receive the electronic message at a first computer, where the first computer has access to a list of passwords comprising a first password. Responsive to a second password contained in the electronic message matching the first password, message routing system 300 can route the electronic message to a second computer. In still other examples, such a password-enabled messaging system can be used together with the above examples. In still other examples, computer program products or data processing systems can implement message routing system 300 for any of the above examples.

FIG. 4 through FIG. 7 show graphical user interfaces for an electronic message routing system, such as the one described with respect to FIG. 3. In FIG. 4 through FIG. 7 similar reference numerals refer to similar features. Additionally, each of the participants described with respect to FIG. 4 through FIG. 7 send electronic messages from different computers.

Figure 4:
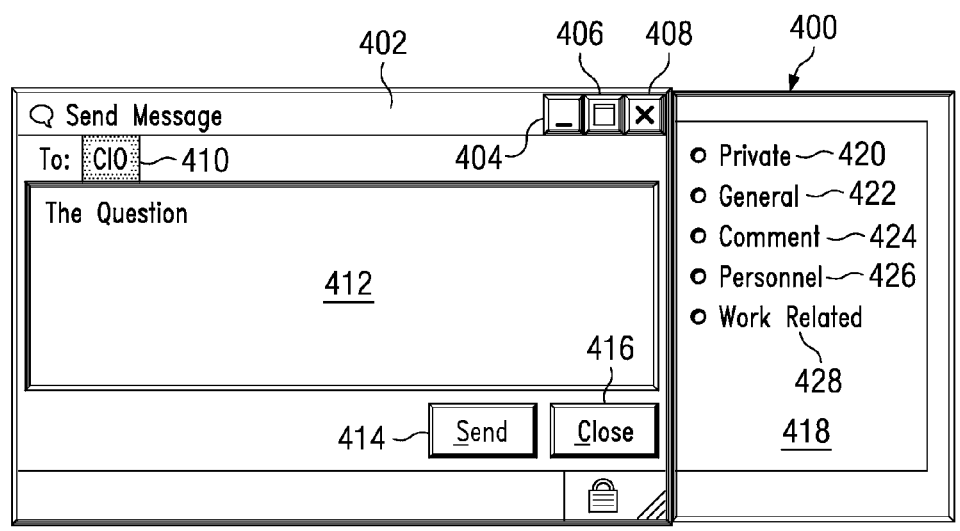
FIG. 4 is a graphical user interface of an electronic message routing system, in accordance with an illustrative embodiment of the present invention.

FIG. 4 is a graphical user interface of an electronic message routing system, in accordance with an illustrative embodiment of the present invention. Graphical user interface 400 can be part of message routing system 300, messaging software 310, or messaging software 314 shown in FIG. 3. Graphical user interface 400 can be further implemented on a data processing system, such as data processing systems 104, 106, 110, 112, 114 in FIG. 1, 200 in FIG. 2, or 308 and 312 in FIG. 3.

In the illustrative example shown in FIG. 4, graphical user interface 400 shows an instant messaging system. "Send message" dialog box 402 is shown, which can contain minimize window button 404, maximize window button 406, and close-out window button 408. The designated recipient of an electronic message is specified in "To:" window 410. In the example shown in FIG. 4, "To:" window 410 indicates that the designated recipient is to be the chief information officer (CIO) of an organization. Text box 412 is an area in which the sender can type a question or message.

Graphical user interface 400 can include one or more command buttons, such as "send" button 414 and "close button" 416. "Send" button 414 can be selected when a user desires to send an electronic message in text box 412 to the designated recipient or recipients. "Close" button 416 can be selected when a user desires to close the instant messaging session. Either "send" button 414 or "close" button 416 can be grayed out, or rendered inoperable, by the message routing system.

Graphical user interface 400 also includes subject matter window 418. Subject matter window 418 allows the sender to designate a pre-defined subject for the electronic message. The sender selects the appropriate subject by clicking on a circle corresponding to the subject matter of interest. In response, the corresponding circle will be filled in graphical user interface 400. In some examples, the sender can select one subject matter circle, though in other examples the sender can select two or more subject matter circles simultaneously, or the sender can select a particular maximum number of circles.

In the illustrative example shown in FIG. 4, five pre-defined subjects are shown, subject: private 420, subject: general 422, subject: comment 424, subject: personnel 426, and subject: work related 428. More, fewer, or different pre-defined subjects can be included than those shown in FIG. 4.

Figure 5:
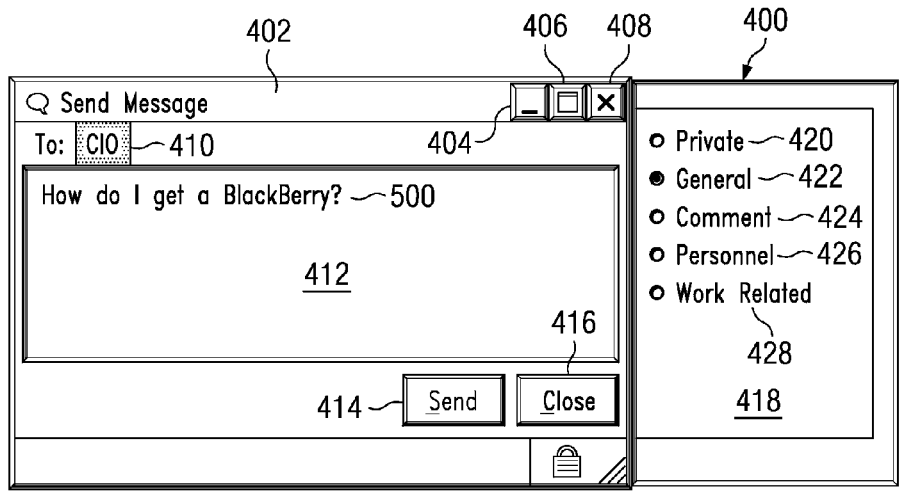
FIG. 5 is a graphical user interface of an electronic message routing system, in accordance with an illustrative embodiment of the present invention.

FIG. 5 is a graphical user interface of an electronic message routing system, in accordance with an illustrative embodiment of the present invention. Graphical user interface 400 can be part of message routing system 300, messaging software 310, or messaging software 314 shown in FIG. 3. Graphical user interface 400 can be further implemented on a data processing system, such as data processing systems 104, 106, 110, 112, 114 in FIG. 1, 200 in FIG. 2, or 308 and 312 in FIG. 3.

FIG. 5 is similar to FIG. 4, except that sender has typed question 500, "How do I get a BlackBerry?" in text box 412. Sender has designated the subject matter of the intended electronic message to be "general," as shown by the filled-in circle corresponding to subject: general 422. In FIG. 5, the sender has already sent the message; thus, "send" button 414 is grayed out.

Figure 6:
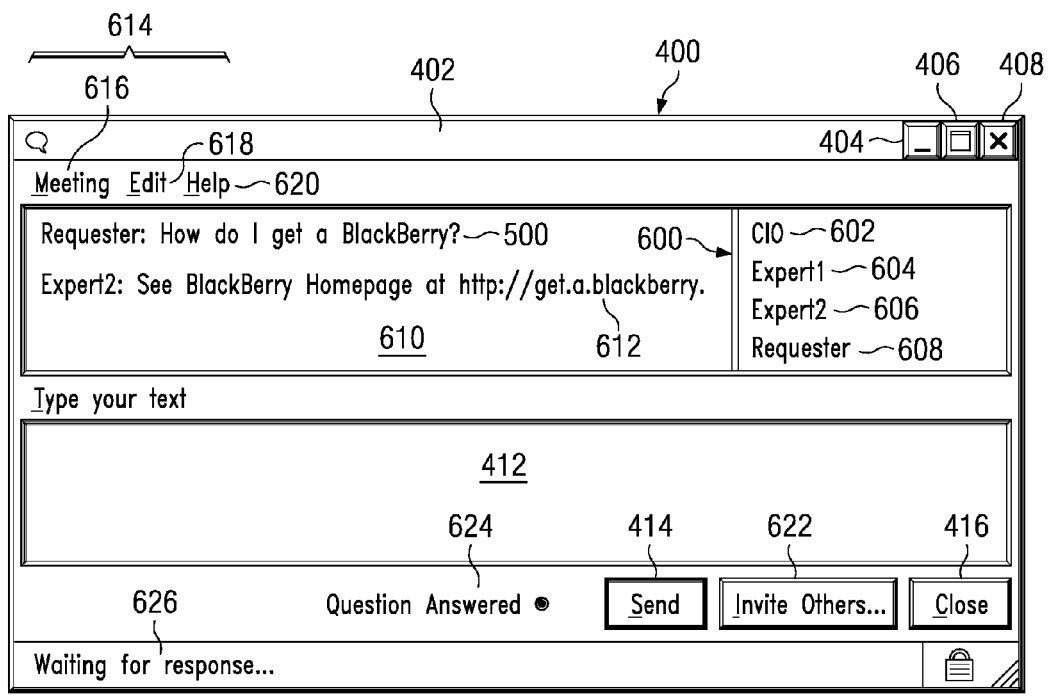
FIG. 6 is a graphical user interface of an electronic message routing system, in accordance with an illustrative embodiment of the present invention.

FIG. 6 is a graphical user interface of an electronic message routing system, in accordance with an illustrative embodiment of the present invention. Graphical user interface 400 can be part of message routing system 300, messaging software 310, or messaging software 314 shown in FIG. 3. Graphical user interface 400 can be further implemented on a data processing system, such as data processing systems 104, 106, 110, 112, 114 in FIG. 1, 200 in FIG. 2, or 308 and 312 in FIG. 3.

In FIG. 6, the state of the instant messaging session has changed from that shown in FIG. 5. Subject matter window 418 has been replaced by participant window 600. Participant window 600 shows a number of participants, even though only the chief information officer (CIO) 602 was the initially indicated recipient of the electronic message, as shown in FIG. 5. In this illustrative example, message routing system 300 routed the electronic message question 500, "How do I get a BlackBerry?" to Expert1 604 and Expert2 606. The electronic message was also mirrored to chief information officer (CIO) 602, who can choose to respond or who can choose to let either Expert1 604 or Expert2 606 respond. Requester 608 is also shown, with requester 608 being the sender of the electronic message.

Furthermore, in addition to text window 412, history window 610 has been added. History window 610 shows text previously sent by the sender, as well as replies sent by recipients. In this illustrative example, Expert2 606 has responded to the electronic message with a second electronic message, answer 612, which states, "See BlackBerry Homepage at http://get.a.blackberry."

Other features have been added to graphical user interface 400. Menu 614 has also been added. Menu 614 contains an interface for the sender to issue commands to manipulate aspects of the instant messaging session, including meeting 616, edit 618, and help 620. Furthermore, a new command button has been added, "invite others" button 622. "Invite others" button 622 can be used to invite other participants into the instant messaging session. A "question answered" indicator 624 has also been added. "Question answered" indicator 624 can be actuated by any one of the participants to indicate that the question posed by requester 608 has been answered. As shown in FIG. 6, "question answered" indicator 624 indicates that question 500 has not yet been answered.

Finally, status bar 626 has been added to indicate the status of the instant messaging system. In this illustrative example, "waiting for response" is shown. However, other status indicators are possible, such as "Participant typing response", or other messages.

Figure 7:
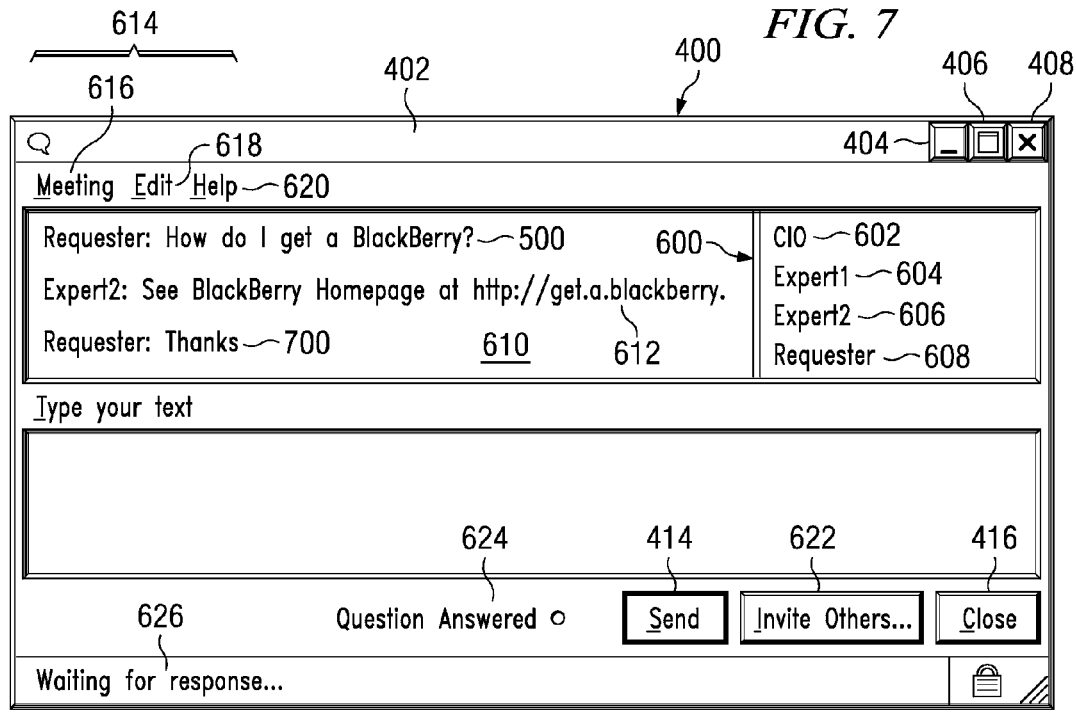
FIG. 7 is a graphical user interface of an electronic message routing system, in accordance with an illustrative embodiment of the present invention.

FIG. 7 is a graphical user interface of an electronic message routing system, in accordance with an illustrative embodiment of the present invention. Graphical user interface 400 can be part of message routing system 300, messaging software 310, or messaging software 314 shown in FIG. 3. Graphical user interface 400 can be further implemented on a data processing system, such as data processing systems 104, 106, 110, 112, 114 in FIG. 1, 200 in FIG. 2, or 308 and 312 in FIG. 3.

FIG. 7 is similar to FIG. 6, however, one or both of Expert2 606 and requester 608 have indicated that the question has been answered, as shown by the change in "question answered" indicator 624. Message routing system 300 can use a keyword, such as the text "thanks" 700 as a prompt to change question answered indicator 624.

Figure 8:
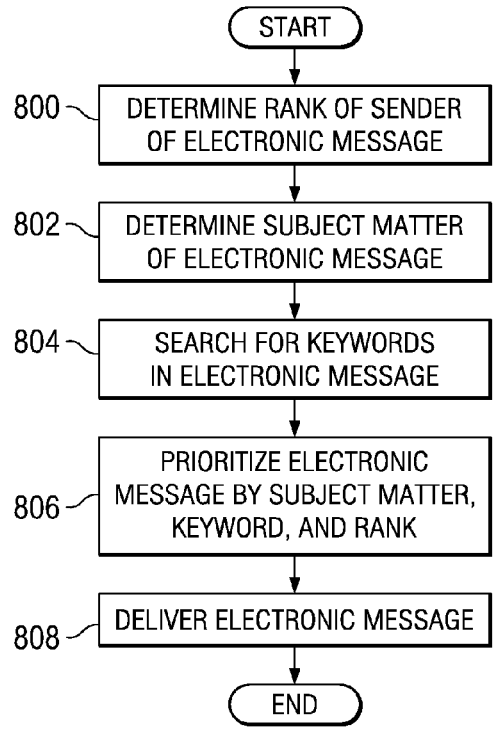
FIG. 8 is a flowchart of a process for delivering an electronic message, in accordance with an illustrative embodiment of the present invention.

FIG. 8 is a flowchart of a process for delivering an electronic message, in accordance with an illustrative embodiment of the present invention. The process shown in FIG. 8 can be implemented using message routing system 300 shown in FIG. 3. The process shown in FIG. 8 can be implemented in one or more data processing systems, such as data processing systems 104, 106, 110, 112, 114 in FIG. 1, 200 in FIG. 2, or 308 and 312 in FIG. 3. The process shown in FIG. 8 is an exemplary process, as numerous rules, processes, and information can be used in combination to route an electronic message, as described above. The process shown in FIG. 8 can be used to deliver either email or instant messages, both of which are electronic messages.

The process begins as an electronic message routing system determines a rank of the sender of an electronic message (process block 800). The message routing system then determines the subject matter of the message (process block 802). As described above, the subject matter of the message can be selected from a group of pre-designated subject matters or can be determined by some other mechanism.

The message routing system then searches for keywords (process block 804). Keywords can be any pre-defined words that are typed in the text of the electronic message. Keywords can be used by the message routing system to determine where to send an electronic message.

The message routing system prioritizes to which computer the electronic message should be sent based on the determined rank, determined subject matter, and found keywords based upon rules specified for the message routing system (process block 806). The message routing system then delivers or routes the electronic message to one or more destination computers (process block 808). The process terminates thereafter.

Figure 9:
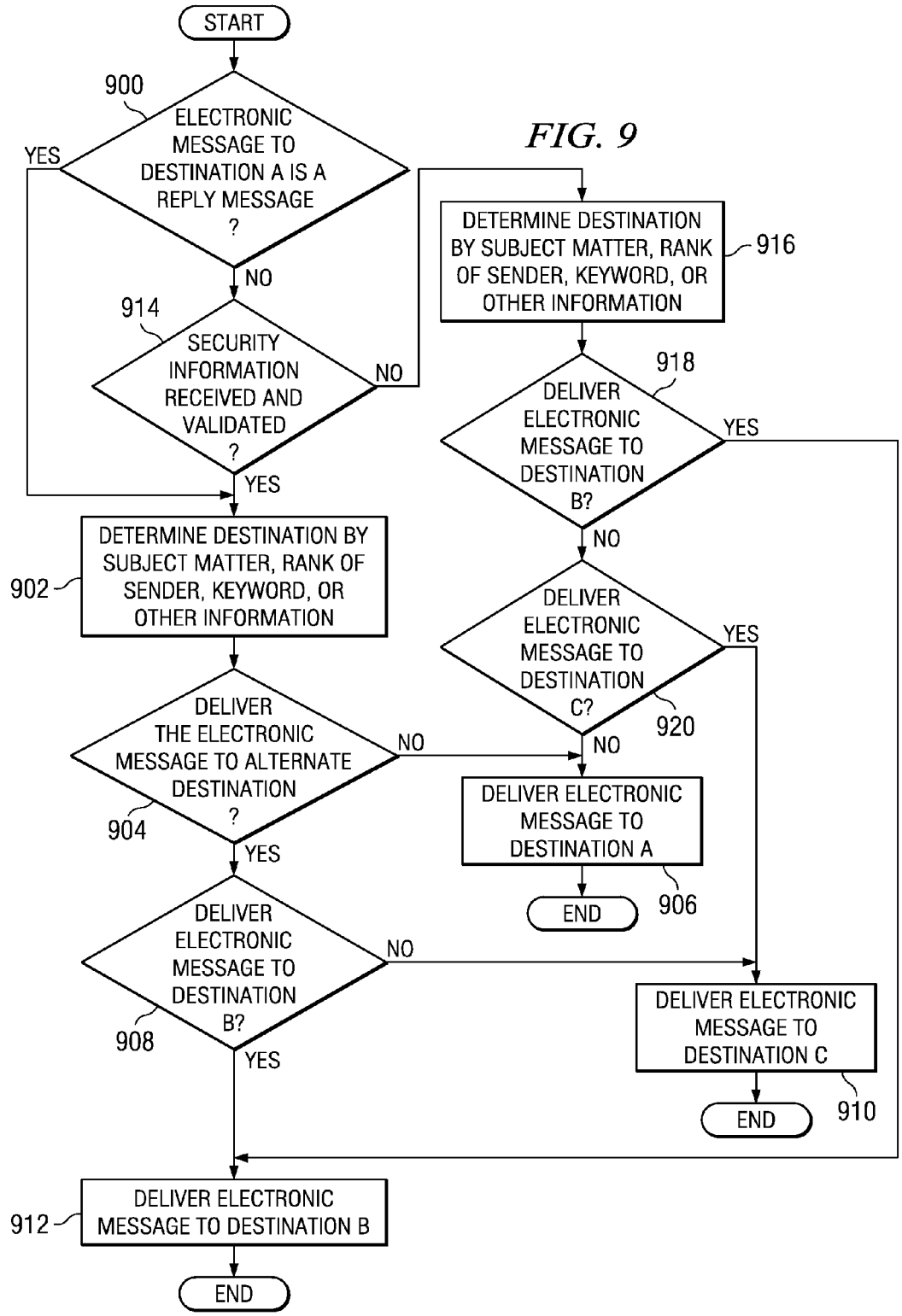
FIG. 9 is a flowchart of a process for delivering an electronic message, in accordance with an illustrative embodiment of the present invention.

FIG. 9 is a flowchart of a process for delivering an electronic message, in accordance with an illustrative embodiment of the present invention. The process shown in FIG. 9 can be implemented using message routing system 300 shown in FIG. 3. The process shown in FIG. 9 can be implemented in one or more data processing systems, such as data processing systems 104, 106, 110, 112, 114 in FIG. 1, 200 in FIG. 2, or 308 and 312 in FIG. 3. The process shown in FIG. 9 is an exemplary process, as numerous rules, processes, and information can be used in combination to route an electronic message, as described above. The process shown in FIG. 9 can be used to deliver either email or instant messages, both of which are electronic messages. In the process shown in FIG. 9, three possible destinations for the electronic message are possible, destination A, destination B, and destination C. However, more or fewer destinations are possible, with the process being adjusted accordingly.

The process begins as the message routing system determines whether a received electronic message intended for destination A is a reply-to message (process block 900). A reply-to message is an electronic message received from a sender that is replying to an electronic message previously sent by the current recipient. If the electronic message intended for destination A is a reply-to message, then the message routing system determines the actual destination of the electronic message based upon subject matter, rank of sender, keyword, or other information as defined by rules contained in the message routing system (process block 902). For example, the electronic message could be routed to another destination under certain circumstances, as provided by the rules for the electronic routing system, as descried with respect to FIG. 3 through FIG. 7.

Thus, the message routing system makes a determination whether to deliver the electronic message to an alternate destination (process block 904). An alternate destination is, in this example, any destination other than destination A. If the answer to the previously described determination (process block 904) is "no," then the message routing system delivers the electronic message to destination A (process block 906). The process terminates thereafter.

Returning to process block 904, if the message routing system is to deliver the electronic message to an alternate destination, then the message routing system determines whether to deliver the electronic message to destination B (process block 908). If the answer to process block 908 is "no," then the message routing system delivers the electronic message to destination C (process block 910). The process terminates thereafter. If the answer to process block 908 is yes, then the message routing system delivers the electronic message to destination B (process block 912). The process again terminates thereafter.

Returning to process block 900, if the electronic message intended for destination A is not a reply-to message, then the message routing system determines if security information contained in the electronic message is received and validated (process block 914). Security information can be a password, a rank, an identity, or other information. Validation can be a password matching, a rank being of sufficiently high level, a particular identity matching an identity on a list of identities, a particular identity not matching an identity on a list of identities, or other forms of validation.

If the security information is received and validated in process block 914, then the process proceeds to process block 902 and proceeds as described above. If the security information is either not received or not validated in process block 914, such that the answer to process block 914 is "no," then the message routing system determines the destination of the electronic message by subject matter, rank of sender, keyword, or other information as defined by rules contained in the message routing system (process block 916).

Thus, for example, the message routing system determines whether to deliver the electronic message to destination B (process block 918). If the answer to process block 918 is "yes," then the message routing system delivers the electronic message to destination B (process block 912). The process terminates thereafter.

If the answer to process block 918 is "no," then the message routing system determines whether to deliver the electronic message to destination C (process block 920). If the answer to process block 920 is "yes," then the message routing system delivers the electronic message to destination C (process block 910). The process terminates thereafter.

However, if the answer to process block 920 is "no," then the message routing system delivers the message to destination A (process block 906). The process terminates thereafter.

Destination A was the intended destination of the electronic message; however, the message routing system determines whether the electronic message actually is sent to destination A based on the rules provided to the message routing system. In the alternative, the message routing system will deliver the electronic message to either destination B or destination C based upon the same rules.

The illustrative embodiments described herein overcome problems associated with known methods of routing electronic messages. For example, the illustrative embodiments provide a means of routing requests to appropriate subject matter experts based on one or more identified topics, the rank of the sender of the electronic message, one or more keywords, or other information. The illustrative embodiments also provide a means of routing routine, repetitive, or easily answered questions away from high ranking individuals within an organization. Thus, those high ranking individuals can address difficult questions and issues or can address those questions and issues that fall within the high ranking individual's bailiwick. Similarly, the illustrative embodiments save time for the high ranking individuals and assist in preventing frustration and aggravation on the part of all users of the message routing system.

Embodiments of the present invention may be implemented entirely in hardware, entirely in software or using a combination of both hardware and software elements. In one embodiment, the invention is implemented in software, including but not being limited to firmware, resident software, microcode, or the like.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain and store, the program for use by or in connection with the instruction execution system, apparatus, or device. A computer usable or computer readable medium can any tangible storage-type or recordable-type medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a communication medium (e.g., a system bus). The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention embodiments in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A method, implemented in a data processing system, of routing an electronic message, the method comprising:
   receiving the electronic message intended for a first recipient in the data processing system from a sender;
   responsive to receiving the electronic message, determining, by a processing unit of the data processing system, a rank, within an organization, of the sender of the electronic message to form an identified rank;
   responsive to a determination that the identified rank of the sender comprises a particular value, assigning, by the processing unit, a shadow answer mode to the electronic message, wherein the shadow answer mode causes electronic messages from a message sender to be routed from an intended message recipient to an alternate message recipient such that the message sender, in communication with the alternate recipient, appears to be in communication with the intended recipient; and
   routing the electronic message to an alternate recipient at a destination data processing system through a network adapter based on the identified rank of the sender and the shadow answer mode.

2. The method of claim 1 further comprising:
   determining a subject matter of the electronic message; and
   wherein the routing further comprises routing the electronic message to the destination data processing system further based upon the subject matter.

3. The method of claim 2 wherein the destination data processing system is associated with a subject matter expert of the subject matter.

4. The method of claim 1 further comprising:
   finding a keyword in the electronic message, wherein routing the electronic message further comprises routing the electronic message to the destination data processing system based upon the keyword.

5. The method of claim 1 further comprising:
   determining a subject matter of the electronic message; and
   finding a keyword in the electronic message, wherein routing the electronic message further comprises routing the electronic message to the destination data processing system based upon the subject matter and the keyword.

6. The method of claim 1 wherein routing further comprises routing the electronic message to the destination data processing system responsive to a determination that the electronic message is a reply to a second electronic message.

7. The method of claim 6 wherein the electronic message is the reply to the second electronic message and wherein routing further comprises routing the electronic message based upon a time elapsed after the electronic message was sent.

8. The method of claim 1 further comprising:
   routing the electronic message as an instant electronic message when the identified rank has at least one of a predetermined value or a user selectable value.

9. The method of claim 1 further comprising:
   routing the electronic message to a second data processing system.

10. The method of claim 9 further comprising:
    causing the electronic message to be displayed only on a display associated with the destination data processing system.

11. The method of claim 1 wherein the electronic message is an instant electronic message in an instant messaging session and wherein the method further comprises:
    routing the electronic message to a second data processing system;
    receiving a second electronic message from the second data processing system; and
    responsive to receiving the second electronic message, changing a state of the instant messaging session, wherein changing the state further comprises changing properties of the instant messaging session.

12. The method of claim 11 wherein changing the state further comprises changing properties of the instant messaging session comprising:
    performing at least one of: closing the instant messaging session, routing all further electronic messages to the second data processing system, routing all further electronic messages to the destination data processing system, routing at least one further electronic message to a third data processing system, routing a copy of an instant messaging session to the second data processing system.

13. The method of claim 1 further comprising:
    maintaining a list of senders, wherein routing further comprises routing the electronic message to the destination data processing system responsive to a determination that the sender is in the list of senders.

14. The method of claim 13 wherein the list of senders is an exclusive list.

15. The method of claim 13 wherein the list of senders is an inclusive list.

16. The method of claim 1 further comprising:
    maintaining a user-defined rule set, wherein routing the electronic message to the destination data processing system is further responsive to using the user-defined rule set.

17. A method of routing an electronic message, the method comprising:
    receiving the electronic message intended for a first recipient at a first data processing system, wherein the first data processing system accesses a list of passwords comprising a first password, in a storage on the data processing system;
    responsive to a determination that the identified rank of the sender comprises a particular value, assigning, by a processing unit of the first data processing system, a shadow answer mode to the electronic message, wherein the shadow answer mode causes electronic messages from a message sender to be routed from an intended message recipient to an alternate message recipient such that the message sender, in communication with the alternate recipient, appears to be in communication with the intended recipient;

comparing, by the processing unit, the first password with a second password contained in the electronic message; and responsive to the second password contained in the electronic message matching the first password and to the shadow answer mode, routing the electronic message through a network adapter to an alternate recipient at a second data processing system.

18. The method of claim 17 further comprising:
determining a subject matter of the electronic message, wherein routing the electronic message to the second data processing system is further based upon the subject matter.

19. The method of claim 17 further comprising:
finding a key word in the electronic message, wherein routing the electronic message to the second data processing system is further based upon the keyword.

20. The method of claim 17 wherein the electronic message is an instant electronic message in an instant messaging session and the method further comprising:
routing the electronic message to a third data processing system;
receiving a second electronic message from the third data processing system; and
responsive to receiving the second electronic message, changing a state of the instant messaging session.

21. The method of claim 17 wherein the electronic message is an instant electronic message in an instant messaging session, wherein the method further comprises:
routing the electronic message to a third data processing system;
receiving a second electronic message from the third data processing system; and
responsive to receiving the second electronic message, changing a state of the instant messaging session, wherein changing the state further comprises changing properties of the instant messaging session.

22. The method of claim 21 wherein changing the state of the instant messaging session comprises one of closing the instant messaging session, routing all further electronic messages to the third data processing system, routing all further electronic messages to the second data processing system, routing at least one further electronic message to a fourth data processing system, routing a copy of an instant messaging session to the third data processing system, or routing the copy of the instant messaging session to the fourth data processing system.

23. A computer program product for routing an electronic message, the computer program product comprising:
a non-transitory computer readable storage medium;
first program instructions to receive the electronic message intended for a first recipient on the data processing system from a sender;
second program instructions to determine a rank by a processing unit of the data processing system, within an organization, of the sender of the electronic message;
third program instructions to assign a shadow answer mode by the processing unit to the electronic message in response to a determination that the identified rank of the sender comprises a particular value, wherein the shadow answer mode causes electronic messages from a message sender to be routed from an intended message recipient to an alternate message recipient such that the message sender, in communication with the alternate recipient, appears to be in communication with the intended recipient; and fourth program instructions to route the electronic message through a network adapter to an alternate recipient at a destination data processing system using the rank of the sender and the shadow mode,
wherein the first, second, third, and fourth program instructions are stored on the non-transitory computer readable storage medium.

24. The computer program product of claim 23 further comprising:
fifth program instructions to determine a subject matter of the electronic message, wherein routing the electronic message to the destination data processing system is further based upon the subject matter.

25. The computer program product of claim 23 further comprising:
fifth program instructions to find a keyword in the electronic message, wherein routing the electronic message to the destination data processing system is further based upon the keyword.

26. The computer program product of claim 23 further comprising:
fifth program instructions to determine a subject matter of the electronic message; and
sixth program instructions to find a keyword in the electronic message, wherein routing the electronic message to the second data processing system is further based upon the subject matter and the keyword.

27. The computer program product of claim 23 wherein the electronic message is an instant electronic message in an instant messaging session and wherein the computer program product further comprises:
fifth program instructions to route the electronic message to a second data processing system;
sixth program instructions to receive a second electronic message from the second data processing system; and
seventh program instructions to change, responsive to receiving the second electronic message, a state of the instant messaging session, wherein changing the state further comprises changing properties of the instant messaging session.

28. The computer program product of claim 27 wherein changing the state of the instant messaging session comprises one of closing the instant messaging session, routing all further electronic messages to the second data processing system, routing all further electronic messages to the destination data processing system, routing at least one further electronic message to a third data processing system, routing a copy of an instant messaging session to the second data processing system, or routing the copy of the instant messaging session to the third data processing system.

29. A computer system for routing an electronic message comprising:
a processor, a computer readable memory, and a computer readable storage medium;
first program instructions to receive the electronic message intended for a first recipient on the data processing system from a sender;
second program instructions to determine a rank, within an organization, of the sender of the electronic message;
third program instructions to assign a shadow answer mode by the processing unit to the electronic message in response to a determination that the identified rank of the sender comprises a particular value, wherein the shadow answer mode causes electronic messages from a message sender to be routed from an intended message recipient to an alternate message recipient such that the message sender, in communication with the alternate recipient, appears to be in communication with the intended recipient; and fourth program instructions to route the electronic message to an alternate recipient at a destination data processing system through a network adapter based on the rank of the sender and the shadow mode;

wherein the first, second, third, and fourth program instructions are stored on the computer readable storage medium for execution by the processor via the computer readable memory.

30. The data processing system of claim 29, further comprising:

fifth program instructions to determine a subject matter of the electronic message, wherein the processing unit carries out the set of computer executable instructions to route the electronic message to the second data processing system further based upon the subject matter.

31. The data processing system of claim 29, further comprising:

fifth program instructions to find a keyword in the electronic message, wherein the processing unit carries out the set of computer executable instructions to route the electronic message to the destination data processing system further based upon the keyword.

32. The data processing system of claim 29, further comprising:

fifth program instructions to determine a subject matter of the electronic message; and sixth program instructions to find a keyword in the electronic message, wherein the processing unit carries out the set of computer executable instructions to route the electronic message to the second data processing system further based upon the subject matter and the keyword.

33. The data processing system of claim 29 wherein the electronic message is an instant electronic message in an instant messaging session and further comprising:

fifth program instructions to route the electronic message to a second data processing system;

sixth program instructions to receive a second electronic message through the network adapter from the second data processing system; and seventh program instructions to responsive to receiving the second electronic message, change a state of the instant messaging session, wherein changing the state further comprises changing properties of the instant messaging session.

34. The data processing system of claim 33 wherein changing the state of the instant messaging session, wherein changing the state further comprises changing properties of the instant messaging session comprises one of closing the instant messaging session, routing all further electronic messages to the second data processing system, routing all further electronic messages to the destination data processing system, routing at least one further electronic message to a third data processing system, routing a copy of an instant messaging session to the second data processing system, or routing the copy of the instant messaging session to the third data processing system.

35. The data processing system of claim 29, further comprising:

fifth program instructions to route the electronic message as an instant electronic message when the rank has at least one of a predetermined value or a user selectable value.

* * * * *